(12) United States Patent
Chen et al.

(10) Patent No.: US 12,430,376 B2
(45) Date of Patent: Sep. 30, 2025

(54) USER-FOCUSED, ONTOLOGICAL, AUTOMATIC TEXT SUMMARIZATION USING A BI-DIRECTIONAL NEURAL NETWORK FOR SELECTING ANSWERS BASED ON THEIR UNCOMMON WORDS TO USER QUERIES

(71) Applicant: Battelle Memorial Institute, Columbus, OH (US)

(72) Inventors: Po-Hsu Chen, Dublin, OH (US); Jordan L. Vasko, Columbus, OH (US); Mitch R. Gauthier, Columbus, OH (US); Amy Leibrand, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 376 days.

(21) Appl. No.: 17/514,179

(22) Filed: Oct. 29, 2021

(65) Prior Publication Data
US 2022/0138241 A1    May 5, 2022

Related U.S. Application Data

(60) Provisional application No. 63/108,214, filed on Oct. 30, 2020.

(51) Int. Cl.
| | | |
|---|---|---|
| *G06F 16/34* | (2025.01) | |
| *G06F 16/28* | (2019.01) | |
| *G06F 16/3329* | (2025.01) | |
| *G06F 16/3332* | (2025.01) | |
| *G06F 16/36* | (2019.01) | |
| *G06F 16/907* | (2019.01) | |
| *G06F 40/295* | (2020.01) | |

(52) U.S. Cl.
CPC ........ *G06F 16/345* (2019.01); *G06F 16/3329* (2019.01); *G06F 16/3338* (2019.01); *G06F 16/367* (2019.01); *G06F 40/295* (2020.01)

(58) Field of Classification Search
CPC .... G06F 16/345; G06F 16/284; G06F 16/907; G06F 16/36
USPC ........................................................ 707/739
See application file for complete search history.

(56) References Cited

U.S. PATENT DOCUMENTS

| | | | |
|---|---|---|---|
| 11,262,978 B1 * | 3/2022 | Cohen | G06F 16/907 |
| 2016/0179945 A1 * | 6/2016 | Lastra Diaz | G06F 16/284 |
| | | | 707/739 |

FOREIGN PATENT DOCUMENTS

| | | | | |
|---|---|---|---|---|
| CN | 108345640 A | * | 7/2018 | G06F 16/36 |

* cited by examiner

*Primary Examiner* — Farzad Kazeminezhad
(74) *Attorney, Agent, or Firm* — Grossman, Tucker, Perreault & Pfleger, PLLC; Donald G. Weiss

(57) ABSTRACT

The present disclosure is directed to systems and methods of providing systems and methods of autonomously generating summary documents based, at least in part, on a plurality of queries provided by a system user. The systems and methods disclosed herein include processor circuitry to identify a plurality of information sources for a specific topic guided by an ontology with specific concepts and relations. The systems and methods disclosed herein also include processor circuitry to generate user-focused extractive text summarization from each of at least some of the plurality of identified information sources using a plurality of queries supplied by the user/researcher.

20 Claims, 3 Drawing Sheets

USER-FOCUSED, ONTOLOGICAL, AUTOMATIC TEXT SUMMARIZATION USING A BI-DIRECTIONAL NEURAL NETWORK FOR SELECTING ANSWERS BASED ON THEIR UNCOMMON WORDS TO USER QUERIES

CROSS-REFERENCE TO RELATED APPLICATIONS

The present application claims the benefit of the filing date of U.S. Provisional Application Ser. No. 63/108,214, filed Oct. 30, 2020, the entire teachings of which application are hereby incorporated herein by reference.

TECHNICAL FIELD

The present disclosure relates to targeted information harvesting, more specifically to an ontological topic classification system featuring user query-based retrieval and summarization.

BACKGROUND

The volume of scientific literature increases annually at a rate that makes it difficult for interested parties to, first, locate relevant sources of information and, second, review the relevant sources of information; and finally, summarize the leanings from a potentially large (and increasing) number of relevant information sources.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
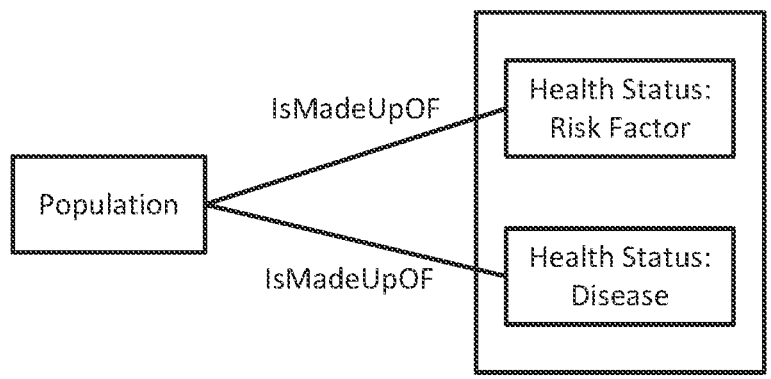
FIG. 1 diagrammatically illustrates concepts and the relation between the concepts in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Automatic Text Summarization (ATS) is an application of Natural Language Processing (NLP) that has been adapted to assist in the extraction of relevant information from a large number of potentially relevant information sources. ATS describes the process of generating shorter versions of information from an information source by extracting the most important sentences available in the text without alteration or creating a summary of the original text using fewer words. ATS saves researcher's time in reading through a large number of information sources to determine the relevance of each of the information sources and also pinpoints the answers to researcher's questions.

One issue with ATS systems is the generated text summarization is frequently too broad or too general to provide specific information relevant to the specific needs or goals of the researcher to efficiently scan the relatively large number of information sources identified as relevant. Because of time constraints, the researcher may skip a potentially important information source and lose critical information or may waste time reviewing an information source that is redundant, or worse, irrelevant to the focus of the researcher's query. One way of addressing this issue is to select manually annotated information sources from domain-specific documentations. However, such approaches are arduous, expensive, time consuming, and limited in scope.

The systems and methods disclosed herein beneficially and advantageously address the aforementioned weaknesses by, first, identifying relevant information sources for a specific topic guided by an ontology with specific concepts and relations, and, second, generating of user-focused extractive text summarization from each of the identified relevant information sources using queries supplied by the user/researcher. Beneficially, the systems and methods disclosed herein extract summary sentences from unstructured text without requiring manual annotation of each information source. Additionally, by avoiding the need for manual annotation, the systems and methods disclosed herein are readily adaptable and effective at searching information sources in emergent topics that may have scant, if any, existing domain documentation.

In general, a system and method consistent with the present disclosure provides advantages over the prior art using an ontology-based topic identification combined with a user-focused text summarization. The ontology-based topic identification identifies at least one of a plurality of information sources as being related to a specific topic using an ontology with specific concepts and relations. User-focused text summarization is performed using a plurality of queries provided by a user. Information from at least one of the plurality of identified information sources is extracted from the information source using the queries supplied by the user/researcher. A summary of the extracted information is then generated.

Ontology-Based Topic Identification

To perform an ontology-based topic identification an ontology is first constructed, e.g., for a specific domain, to describe high-level knowledge regarding the subject matter. One goal of the ontology is to standardize one or more features included in relevant information gathered from the plurality of information sources into a set of concepts interrelated by a matrix of relationships. This allows the systematic representation of information present in information sources deemed relevant, thus enabling the identification and extraction of concepts and relationships in a structured format that enables autonomous semantic reasoning and analysis by processor circuitry.

For example, medical experts may be interested in topics that include certain risk factors of COVID-19, such as diabetes, hypertension, etc. In such an embodiment, an ontology may be constructed for the domain to describe high-level knowledge regarding COVID-19 risk factors.

In some embodiments, a COVID-19 risk factor ontology may be a simplified version of a known CQM ontology that excludes "Change Concept" as a component an includes a "Population" that is made up of two different "Health Statuses". The concepts, i.e., Population and Health Status, and relation, i.e., "IsMadeUpOf", for this simplified COVID-19 risk factor ontology are shown in Table 1 below:

TABLE 1

| Concept | Definition | Examples |
| --- | --- | --- |
| Population | Population and related attributes | Patients, Adults, Females |
| Health Status | Signs or symptoms, disorder, disease, complication, functional status, advanced illness | Diabetes, Hypertension, Obesity, Infection, Labored breathing |
| Relation | Definition | (Domain, Range) |
| IsMadeUpOf | Represents how objects combine to form composite objects | (Population, Health Status) |

FIG. 1 diagrammatically illustrates the Population and Health Status concepts and the relation, IsMadeUpOf (includes), between the concepts shown in Table 1.

Identification of relevant information sources using an ontology may be accomplished in two main steps: first, extraction of concepts and relations from a plurality of information sources in accordance with the ontology; and second, a comparison of the concepts included in each information source using a matching algorithm to determine the relevancy of the information source. These steps may be performed in a variety of different ways.

Figure 2:
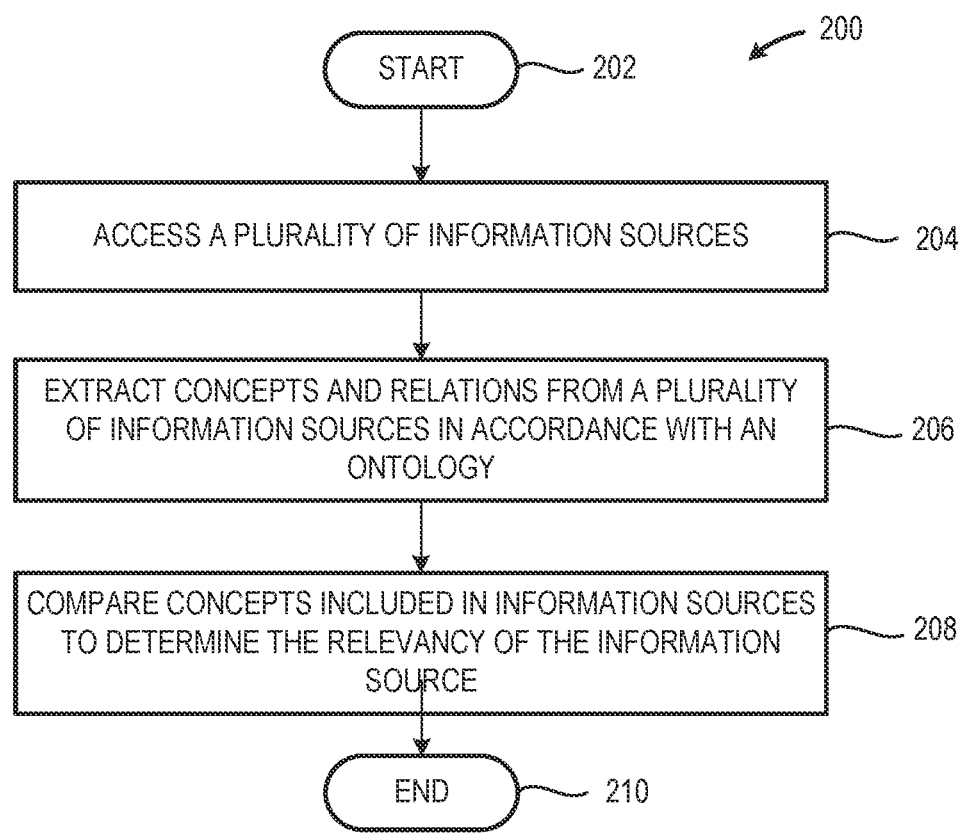
FIG. 2 is a high-level flow diagram depicting an illustrative method of identifying relevant information sources for a specific topic guided by an ontology with specific concepts and relations, in accordance with at least one embodiment described herein.

Identification of relevant information sources as being related to a specific topic may be accomplished in a variety of manners. FIG. 2 is a high-level flow diagram depicting one example of a method 200 consistent with the present disclosure for identifying relevant information sources for a specific topic in response to a user query in accordance with an ontology. Flow diagrams, such as FIG. 2, may be shown and described herein as including a particular sequence of steps. The illustrated sequence of steps in any flow diagram merely provides an example of how the general functionality described herein can be implemented. The steps do not have to be executed in the order presented unless otherwise indicated. In addition, it is to be understood that other embodiments consistent with the present disclosure may include subcombinations of the illustrated steps and/or additional steps described herein. Thus, claims presented herein may be directed to all or part of the components and/or operations depicted in one or more figures.

The method 200 commences at 202. At 204, processor circuitry accesses a plurality of information sources. Information sources may include but are not limited to any tangible or electronic means of communicating information that is accessible by the processor circuitry. Such information sources may include information obtained via one or more networks, such as one or more local area networks (LAN), one or more wide area networks, one or more worldwide networks such as the Internet.

At 206, in response to a user query the processor circuitry extracts concepts and relations from a plurality of information sources in accordance with the ontology. The processor circuitry may include known natural language processing (NLP) circuitry to extract the concepts and the relationships from some or all of the plurality of information sources accessed at 204. The NLP circuitry may, for example, include trained machine learning circuitry such as known Name Entity Recognition (NER) circuitry and known Semantic Relation (SR) circuitry to extract the plurality of concepts and the plurality of relationships, respectively, from the plurality of information sources. The NER circuitry and/or the SR circuitry may implement any known model, including, for example, a Transformer model or a Bidirectional Long Short-Term Memory Conditional Random Field (Bi-LSTM CRF) model. A Bi-LSTM CRF may use neural network circuitry that includes a known long short-term memory (LSTM) layer circuitry. The LSTM layer circuitry may process sentences in a bi-directional manner (a Bi-LSTM) to ensure the neural network circuitry obtains a more complete view of the content. In some embodiments, the processor circuitry may include neural network circuitry to perform the NER and SR detection using an output from the LSTM layer circuitry as an input to known Conditional Random Field (CRF) circuitry. In some embodiments, the processor circuitry may include neural network circuitry having at least one bi-directional Long Short-Term Memory (Bi-LSTM) layer to perform the NER and SR detection.

At 208, the processor circuitry compares the extracted concepts included in at least some of the information sources to determine the relevancy of the information source. This may be accomplished in a variety of ways. In some embodiments, the processor circuitry may include graphical analysis circuitry to generate the graphical representation of the identified concepts and relations. One example of a known graphics package useful for creating a graphical representation of the concepts and relations is the open-source package known as igraph.

For example, in medical research, a clinical quality management (CQM) ontology may be employed, and the graphical analysis circuitry may generate concept graphs that include data representative of the knowledge of the CQMs. The processor circuitry may include matching circuitry to determine the relevancy of each document to a CQM ontology using "gold standard graphs" that were manually annotated from CQM descriptions according to the CQM ontology. In the context of the COVID-19 ontology described in connection with FIG. 1, the relevancy of each document to a risk factor of COVID-19 (e.g., hypertension) may be determined using a model, e.g., a word2vec model, trained on PubMed® abstracts. For example, using a graphical representation of the concepts and relations, if the distance (1 minus cosine similarity) of the health status risk factor is less than a threshold for that particular risk factor, then the document is determined to be relevant to that risk factor.

User-Focused Text Summarization

Figure 3:
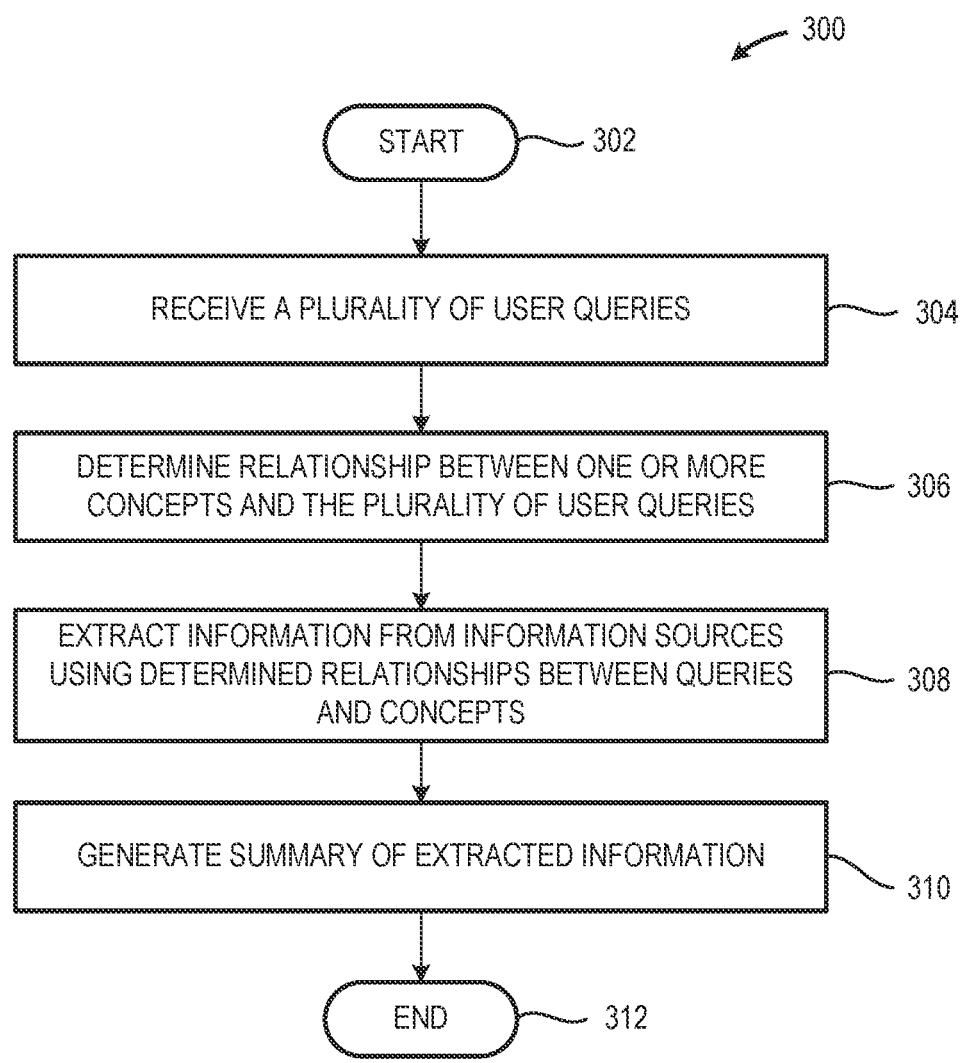
FIG. 3 is a high-level flow diagram depicting an illustrative method of generating user-focused extractive text summarization from each identified relevant information source using queries supplied by the user/researcher, in accordance with at least one embodiment described herein.

When the processor circuitry determines that an information source is relevant to a user's interest, text summarization circuitry within the processor circuitry generates a text summarization output in response to at least some of a plurality of queries provided to the processor circuitry by the researcher/system user. In embodiments, the processor circuitry may include Question Answering (QA) circuitry to extract answers verbatim from unstructured text based on at least some of the plurality of user queries and summarization generation circuitry to summarize and organize the answers extracted by the QA circuitry for presentation to the user. FIG. 3 is a high-level flow diagram depicting an illustrative method 300 of generating of user-focused extractive text summarization from each identified relevant information sources using queries supplied by the user/researcher, in accordance with at least one embodiment described herein.

The method 300 commences at 302. At 304, the processor circuitry receives a plurality of user-initiated queries associated with an area of interest of the user. The plurality of queries may be provided using one or more input devices communicatively coupled to one or more input interface circuits included in the processor circuitry. The one or more input devices may include one or more tactile input devices such as a keyboard, one or more voice input devices such as a microphone, one or more touch or gesture-based input devices such as a touchscreen, or any combination thereof.

At 306, the processor circuitry determines one or more relationships between the queries provided by the user and the concepts used in the ontology. At 308, the processor circuitry extracts information relevant to at least some of the plurality of queries provided by the user. In some embodiments, the processor circuitry may include NLP models such as a QA model and a sentence importance model. The QA model is fine-tuned from the Bidirectional Encoder Representations from Transformers (BERT) circuitry. The BERT-based QA circuitry calculates a probability distribution for the beginning and the end terms of a proposed answer given a specific question. The BERT-based QA circuitry then extracts the answer verbatim from the text using the sentences identified as providing the most probable beginning and end. One example of user-provided queries and associated extracted answers is shown in TABLE 2 below:

TABLE 2

| Questions | Extracted Answer |
|---|---|
| Q1 Are patients with hypertension? | Patients with at least one coexisting underlying conditions and patients with hypertension were observed in 28.8% and 16.8% |
| Q2 Which hospital is studied? | Zhejiang China |
| Q3 What is the date of the study? | January 17 to February 8 |
| Q4 Is this a prospective observational study, retrospective observational study, or systematic study? | retrospective |
| Q5 How many patients are in this study? | 645 |
| Q6 How many studies are in this article? | COVID-19 |
| Q7 Is there a hypertension odds ratio for fatality patients? | significantly higher than the non-pneumonia patients all $P < 0.05$ |
| Q8 Is there a hypertension odds ratio for severe patients? | significantly higher than the non-pneumonia patients all $P < 0.05$ |

In some embodiments, the sentence important circuitry may also include sentence scoring circuitry to rank multiple sentences identified as including potential answers to at least some of the plurality of queries provided by the user. The sentence important circuitry may tokenize each sentence identified as relevant and generate a score that includes the sum of Term-Frequency values for uncommon words included in each of the sentences identified as relevant. In embodiments where multiple sentences have been identified as potentially relevant in providing the answer to the user's query, the sentence important circuitry may select only the sentence with highest score.

At 310, the processor circuitry summarizes entire sentences extracted from the information sources selected by the processor circuitry as including relevant information at 308. In embodiments, the processor circuitry may include summarization circuitry to select the sentences returned at 308. In embodiments, the summarization circuitry may organize the extracted sentences into a summary document based, at least in part on the score assigned to the sentence by the BERT circuitry at 308. The method concludes at 312.

One example of a summary document associated with the extracted answers from TABLE 2 above is shown Example 1 below, wherein italicized font indicates extracted answers in the sentences:

Example 1

Patients with at least one coexisting underlying conditions and patients with hypertension were observed in 28.8% and 16.8% of the 573 patients respectively, which was significantly higher than the non-pneumonia patients all P<0.5. For this retrospective study, 645 patients confirmed with SARS-CoV-2 infection between Jan. 17 and Feb. 8, 2020 underwent a CT examination or X-ray, in Zhejiang, China. Patients confirmed with SARS-CoV-2 infection in Zhejiang province from January 17 to February 8 who had undergone CT or X-ray were enrolled. In our retrospective study, we evaluated and compared the epidemiological clinical features and laboratory data of those with abnormal imaging findings. The imaging findings of SARS-CoV-2 pneumonia are similar to acute respiratory syndrome SARS and Middle East respiratory syndrome MERS which are characterized as pulmonary ground-glass opacities and consolidation (Das et al. 2016). 139 (21.5%) patients of the total 645 patients had one affected lobe, 204 (31.6%) patients had two affected lobes, 136 (21.1%) patients had three lobes affected, 66 (10.2%) had four affected lobes, and (28 4.4%) patients had five affected lobes. Finally, according to the admission data risk factors for severe critical type of COVID-19 were identified; however, we still lack a prediction model for disease progression. In conclusion, there are certain characteristics of the chest imaging of COVID-19 patients we reported the differences in specific epidemiological and clinical features between patients with abnormal or normal imaging including fever cough and sputum production and relatively poor laboratory results.

System Architecture

Figure 4:
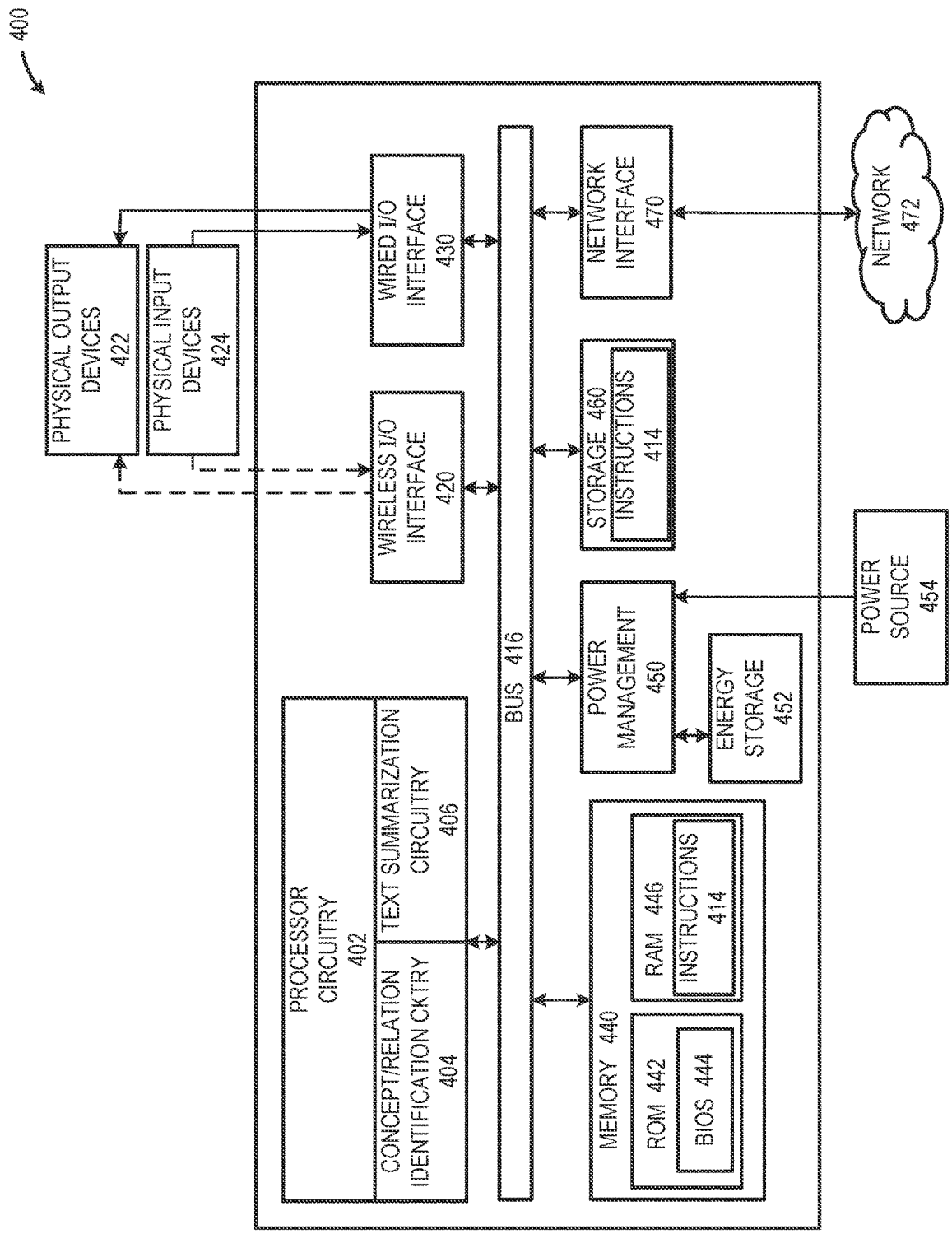
FIG. 4 is a schematic diagram of an illustrative system to identify relevant information sources for a specific topic guided by an ontology with specific concepts relations and generate user-focused extractive text summarization from each identified relevant information source using queries supplied by the user/researcher, in accordance with at least one embodiment described herein.

FIG. 4 is a schematic diagram of an illustrative electronic, processor-based, device 400 that includes processor circuitry 402 having concept/relation identification circuitry 404 and text summarization circuitry 406, in accordance with at least one embodiment described herein. The processor-based device 400 may additionally include one or more of the following: a wireless input/output (I/O) interface 420, a wired I/O interface 430, system memory 440, power management circuitry 450, a non-transitory storage device 460, and a network interface 470. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

The processor-based device 400 includes processor circuitry 402 having concept and relation identification circuitry 404 and text extraction and summarization circuitry 406. In some embodiments, the concept and relation identification circuitry 404 may perform at least some of the ontology-based topic identification described herein, such as, for example, at least some of the method 200 described in detail in FIG. 2, above. In embodiments, the text extraction and summarization circuitry 406 may perform at least some of the user-focused text summarization described herein, such as, for example, at least some of method 300 described in detail in FIG. 3, above.

In some embodiments, the processor circuitry 402 may be capable of executing machine-readable instruction sets 414 and generating an output signal capable of providing a display output that includes a text summarization to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor circuitry 402 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions. The processor circuitry 402 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The processor-based device 400 includes a bus or similar communications link 416 that communicably couples and facilitates the exchange of information and/or data between various system components including the processor circuitry 402, one or more wireless I/O interfaces 420, one or more wired I/O interfaces 430, the system memory 440, the power management circuitry 450, the one or more storage devices 460, and/or one or more network interfaces 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The system memory 440 may include read-only memory ("ROM") 442 and random access memory ("RAM") 446. At least a portion of the system memory 440 may be apportioned into at least a kernel memory space and a user memory space. A portion of the ROM 442 may be used to store or otherwise retain a basic input/output system ("BIOS") 444. The BIOS 444 provides basic functionality to the processor-based device 400, for example by causing the processor circuitry 402 to load and/or execute one or more machine-readable instruction sets 414. In embodiments, at least some of the one or more machine-readable instruction sets 414 cause at least a portion of the processor circuitry 402 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include but are not limited to: universal serial bus (USB), IEEE 1394 ("FireWire"), and similar.

The processor-based device 400 may include one or more communicably coupled, non-transitory, data storage devices 460. The data storage devices 460 may include one or more hard disk drives (HDDs) and/or one or more solid-state storage devices (SSDs). The one or more data storage devices 460 may include any current or future developed storage appliances, network storage devices, and/or systems. Non-limiting examples of such data storage devices 460 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 460 may include one or more removable storage devices, such as one or more flash drives, flash memories, flash storage units, or similar appliances or devices capable of communicable coupling to and decoupling from the processor-based device 400.

The one or more data storage devices 460 may include interfaces or controllers (not shown) communicatively coupling the respective storage device or system to the bus 416. The one or more data storage devices 460 may store, retain, or otherwise contain machine-readable instruction sets, data structures, program modules, data stores, databases, logical structures, and/or other data useful to the processor circuitry 402 and/or one or more applications executed on or by the processor circuitry 402. In some instances, one or more data storage devices 460 may be communicably coupled to the processor circuitry 402, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Machine-readable instruction sets 414 and other programs, applications, logic sets, and/or modules may be stored in whole or in part in the system memory 440. Such instruction sets 414 may be transferred, in whole or in part, from the one or more data storage devices 460. The instruction sets 414 may be loaded, stored, or otherwise retained in system memory 440, in whole or in part, during execution by the processor circuitry 402.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 402, the wireless I/O interface 420, the wired I/O interface 430, the system memory 440, the power management circuitry 450, the storage device 460, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 402. In some embodiments, all or a portion of the bus 416 may be omitted and the components are coupled directly to each other using suitable wired or wireless connections.

Thus, the present disclosure is directed to systems and methods of providing systems and methods of autonomously generating summary documents based, at least in part, on a plurality of queries provided by a system user. The systems and methods disclosed herein include processor circuitry to identify relevant information sources for a specific topic guided by an ontology with specific concepts and relations. The systems and methods disclosed herein also include processor circuitry to generate user-focused extractive text summarization from each identified information source using a plurality of queries supplied by the user/researcher.

According to one aspect of the present disclosure, there is provided an ontology-based text summarization system including: input interface circuitry; output interface circuitry; non-transitory storage circuitry to store one or more machine-readable instruction sets; and processor circuitry communicatively coupled to the input interface circuitry, the output interface circuitry, and to the non-transitory storage circuitry, the processor circuitry to: access a plurality of information sources; identify at least one of the plurality of information sources as being related to a topic using an ontology with specific concepts and relations between the concepts; receive a plurality of queries provided by a user via the input interface circuitry; extract information from the at least one of the plurality of information sources based on the plurality of queries; and generate a summary of the extracted information.

According to another aspect of the present disclosure, there is provided a non-transitory machine-readable storage medium that includes instructions that, when executed by processor circuitry, cause the processor circuitry to: access a plurality of information sources; identify at least one of the plurality of information sources as being related to a topic using an ontology with specific concepts and relations between the concepts; receive a plurality of queries provided by a user via the input interface circuitry; extract information from the at least one of the plurality of information sources based on the plurality of queries; and generate a summary of the extracted information.

According to another aspect of the present disclosure, there is provided an ontology-based text summarization method, including: accessing, by processor circuitry, a plurality of information sources; identifying, by processor circuitry, at least one of the plurality of information sources as being related to a topic using an ontology with specific concepts and relations between the concepts; receiving, by the processor circuitry, a plurality of queries provided by a user via the input interface circuitry; extracting, by the processor circuitry, information from the at least one of the plurality of information sources based on the plurality of queries; and generating, by the processor circuitry, a summary of the extracted information.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Reference throughout this specification to "embodiments", "one embodiment", "an embodiment" or "some embodiments" means that a particular feature, structure, or characteristic described in connection with the embodiment is included in at least one embodiment. Thus, appearances of the phrases "embodiments", "one embodiment", "an embodiment" or "some embodiments" in various places throughout this specification are not necessarily all referring to the same embodiment. Furthermore, the particular features, structures, or characteristics may be combined in any suitable manner in one or more embodiments.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An ontology-based text summarization system, comprising:
    input interface circuitry;
    output interface circuitry;
    non-transitory storage circuitry to store one or more machine-readable instruction sets;
    neural network circuitry configured to perform Name Entity Recognition and Semantic Relation;
    a long short-term memory circuitry; and
    processor circuitry communicatively coupled to the input interface circuitry, the output interface circuitry, and to the non-transitory storage circuitry, the processor circuitry to:
        search the Internet;
        identify, in response to the search of the Internet, a plurality of information sources on the Internet that are related to a topic;
        identify at least one of the plurality of information sources on the Internet as being related to the topic using an ontology with specific concepts and relations between the concepts;
        receive a plurality of queries provided by a user via the input interface circuitry;
        process sentences in a bi-directional manner to ensure a complete view of content of the sources using the long short-term memory circuitry, wherein the bi-directional manner is attributed to a bi-directional long short-term memory included in the neural network circuitry and is tasked to use a conditional random field model to perform name entity recognition and semantic relation detection;
        tokenize each sentence identified as relevant;
        generate a score that includes a sum of term-frequency values for uncommon words included in each sentence identified as relevant;
        extract a plurality of the concepts and a plurality of relationships from the at least one of the plurality of information sources related to the topic based on the plurality of queries using the neural network circuitry; and
        determine a relevancy of the source by comparing the plurality of the concepts and the plurality of relationships included in the plurality of information sources related to the topic, wherein a sentence with a highest score is selected as an answer to each user query.

2. The system of claim 1, wherein identifying at least one of the plurality of information sources as being related to the topic using the ontology with specific concepts and relations comprises:
    extracting the concepts and relations from the at least one of the plurality of information sources; and
    comparing the extracted concepts to determine a relevancy of the at least one of the plurality of information sources to the topic.

3. The system of claim 2, wherein extracting the concepts and relations from the at least one of the plurality of information sources comprises:
    identifying the concepts included the at least one of the plurality of information sources using Name Entity Recognition (NER) circuitry.

4. The system of claim 3, wherein extracting the concepts and relations from the at least one of the plurality of information sources comprises:
    identifying the relations between each of at least some of the concepts using Semantic Relation (SR) detection circuitry.

5. The system of claim 2, wherein comparing the extracted concepts to determine the relevancy of the at least one the plurality of information sources to the topic comprises generating a graphical representation of at least a portion of the concepts in the at least one of the plurality of information sources.

6. The system of claim 1, wherein the extraction of information from the at least one of the plurality of information sources based on the plurality of queries comprises:
    calculating a probability distribution for beginning and end terms of a plurality of proposed answers to one or more of the queries; and
    extracting information from the at least one of the plurality of information sources based on the plurality of queries provided by the user by selecting one of the proposed answers having the highest probability in the calculated probability distribution.

7. The system of claim 6, wherein extracting information from the at least one of the plurality of information sources based on the plurality of queries comprises extracting at least one entire sentence from the at least one of the plurality of information sources.

8. The system of claim 1, the processor circuitry to:
    determine one or more relationships between the concepts and the plurality of queries, and wherein the extracted information is selected using the determined relationships between the concepts and the plurality of queries.

9. A non-transitory machine-readable storage medium that includes instructions that, when executed by processor circuitry, cause the processor circuitry to:
    search the Internet;
    identify, in response to the search of the Internet, a plurality of information sources on the Internet that are related to a topic;
    identify at least one of the plurality of information sources as being related to the topic using an ontology with specific concepts and relations between the concepts;
    receive a plurality of queries provided by a user;
    extract a plurality of the concepts and a plurality of relationships from the at least one of the plurality of information sources related to the topic based on the plurality of queries;
    process sentences in a bi-directional manner to ensure a complete view of content of the sources using a long short-term memory circuitry, wherein the bi-directional manner is attributed to a bi-directional long short-term memory included in a neural network circuitry and is tasked to use a conditional random field model to perform name entity recognition and semantic relation detection;

tokenize each sentence identified as relevant;

generate a score that includes a sum of term-frequency values for uncommon words included in each sentence identified as relevant; and determine a relevancy of the information source by comparing the plurality of the concepts and the plurality of relationships included in the plurality of information sources related to the topic;

wherein a sentence with a highest score is selected as an answer to each user query.

10. The non-transitory machine-readable storage medium of claim 9, wherein the identifying at least one of the plurality of information sources as being related to the topic using the ontology with specific concepts and relations comprises:

extracting the concepts and relations from the at least one of the plurality of information sources; and comparing the extracted concepts to determine a relevancy of the at least one of the plurality of information sources to the topic.

11. The non-transitory machine-readable storage medium of claim 10, wherein comparing the extracted concepts to determine a relevancy of the at least one of the plurality of information sources to the topic comprises generating a graphical representation of at least a portion of the concepts in the at least one of the plurality of information sources.

12. The non-transitory machine-readable storage medium of claim 10, wherein extracting the concepts and relations from the at least one of the plurality of information sources comprises:

identifying the concepts included the at least one of the plurality of information sources using Name Entity Recognition (NER) circuitry; and identifying the relations between each of at least some of the concepts using Semantic Relation (SR) detection circuitry.

13. The non-transitory machine-readable storage medium of claim 9, wherein the extraction of information from the at least one of the plurality of information sources based on the plurality of queries comprises:

calculating a probability distribution for beginning and end terms of a plurality of proposed answers to one or more of the queries; and extracting information from the at least one of the plurality of information sources based on the plurality of queries provided by the user by selecting one of the proposed answers having the highest probability in the calculated probability distribution.

14. The non-transitory machine-readable storage medium of claim 13, wherein extracting information from the at least one of the plurality of information sources based on the plurality of queries comprises extracting at least one entire sentence from the at least one of the plurality of information sources.

15. The non-transitory machine-readable storage medium of claim 9, the processor circuitry to:

determine one or more relationships between the concepts and the plurality of queries, and wherein the extracted information is selected using the determined relationships between the concepts and the plurality of queries.

16. An ontology-based text summarization method, comprising:

identifying, by processor circuitry, a plurality of concepts included in each of a plurality of information sources;

searching, by processor circuitry, the Internet;

identifying, by the processor circuitry, in response to the search of the Internet, a plurality of information sources on the Internet that are related to a topic;

identifying, by the processor circuitry, at least one of the plurality of information sources as being related to the topic using an ontology with specific concepts and relations between the concepts;

receiving, by the processor circuitry, a plurality of queries provided by a user;

extracting, using neural network circuitry, the plurality of concepts and a plurality of relationships from the at least one of the plurality of information sources related to the topic based on the plurality of queries;

process sentences in a bi-directional manner to ensure a complete view of content of the sources using a long short-term memory circuitry, wherein the bi-directional manner is attributed to a bi-directional long short-term memory included in a neural network circuitry and is tasked to use a conditional random field model to perform name entity recognition and semantic relation detection;

tokenizing, by the processor circuitry, each sentence identified as relevant;

generating, by the processor circuitry, a score that includes a sum of term-frequency values for uncommon words included in each sentence identified as relevant; and determining, by the processor circuitry, a relevancy of the information source by comparing the plurality of concepts and the plurality of relationships included in the plurality of information sources related to the topic;

wherein a sentence with a highest score is selected as an answer to each user query.

17. The ontology-based text summarization method of claim 16, wherein the identifying, by the processor circuitry, at least one of the plurality of information sources as being related to the topic using the ontology with the specific concepts and relations comprises:

extracting the concepts and relations from the at least one of the plurality of information sources; and comparing the extracted concepts to determine a relevancy of the at least one of the plurality of information sources to the topic.

18. The ontology-based text summarization method of claim 17, wherein comparing the extracted concepts to determine the relevancy of the at least one of the plurality of information sources to the topic comprises generating, by the processor circuitry, a graphical representation of at least a portion of the concepts in the at least one of the plurality of information sources.

19. The ontology-based text summarization method of claim 16 further comprising:

determining, by the processor circuitry, one or more relationships between the concepts and the plurality of queries, and wherein the extracted information is selected using the determined relationships between the concepts and the plurality of queries.

20. The ontology-based text summarization method of claim 16, wherein the extracting, by the processor circuitry, information from at least one of the plurality of information sources based on the plurality of queries comprises:

calculating a probability distribution for beginning and end terms of a plurality of proposed answers to one or more of the queries; and extracting at least one entire sentence from the at least one of the plurality of information sources based on the plurality of queries provided by the user by selecting one of the proposed answers having the highest probability in the calculated probability distribution.

\* \* \* \* \*